United States Patent
Kim et al.

(10) Patent No.: US 10,592,466 B2
(45) Date of Patent: Mar. 17, 2020

(54) GRAPHIC PROCESSOR UNIT PROVIDING REDUCED STORAGE COSTS FOR SIMILAR OPERANDS

(71) Applicant: Wisconsin Alumni Research Foundation, Madison, WI (US)

(72) Inventors: Nam Sung Kim, Champaign, IL (US); Zhenhong Liu, Champaign, IL (US)

(73) Assignee: Wisconsin Alumni Research Foundation, Madison, WI (US)

( * ) Notice: Subject to any disclaimer, the term of this patent is extended or adjusted under 35 U.S.C. 154(b) by 327 days.

(21) Appl. No.: 15/152,810

(22) Filed: May 12, 2016

(65) Prior Publication Data

US 2017/0329741 A1   Nov. 16, 2017

(51) Int. Cl.
| | |
|---|---|
| *G06F 15/78* | (2006.01) |
| *G06F 9/30* | (2018.01) |
| *G06F 9/38* | (2018.01) |
| *G06F 1/3234* | (2019.01) |
| *G06F 1/3287* | (2019.01) |
| *G06F 1/3203* | (2019.01) |

(52) U.S. Cl.
CPC ........ *G06F 15/7839* (2013.01); *G06F 1/3203* (2013.01); *G06F 1/3243* (2013.01); *G06F 1/3275* (2013.01); *G06F 1/3287* (2013.01); *G06F 9/30021* (2013.01); *G06F 9/30058* (2013.01); *G06F 9/30141* (2013.01); *G06F 9/3836* (2013.01); *G06F 9/3887* (2013.01)

(58) Field of Classification Search
None
See application file for complete search history.

(56) References Cited

U.S. PATENT DOCUMENTS

| | | | | |
|---|---|---|---|---|
| 6,571,328 | B2* | 5/2003 | Liao | G06F 9/30014 712/22 |
| 2014/0244968 | A1* | 8/2014 | Greyzck | G06F 15/76 712/3 |
| 2014/0317377 | A1* | 10/2014 | Ould-Ahmed-Vall | G06F 9/30036 712/4 |
| 2015/0100764 | A1* | 4/2015 | Tarolli | G06F 9/30072 712/216 |
| 2018/0018173 | A1* | 1/2018 | Hayes | G06F 7/24 |

OTHER PUBLICATIONS

Lee (Decoupled Vector-Fetch Architecture with a Scalarizing Compiler, Jan. 2016, pp. 1-146) (Year: 2016).*
Ping Xiang et al.; "Exploiting uniform vector instructions for GPGPU performance, energy efficiency, and opportunistic reliability enhancement." In Proceedings of the 27th international ACM conference on International conference on supercomputing, pp. 433-442. ACM, 2013. US.

(Continued)

*Primary Examiner* — George Giroux
(74) *Attorney, Agent, or Firm* — Boyle Fredrickson, SC (57) ABSTRACT

A GPU architecture employs a crossbar switch to preferentially store operand vectors in a compressed form allowing reduction in the number of memory circuits that must be activated during an operand fetch and to allow existing execution units to be used for scalar execution. Scalar execution can be performed during branch divergence.

19 Claims, 4 Drawing Sheets

(56) References Cited

OTHER PUBLICATIONS

Yunsup Lee et al.; "Convergence and scalarization for data-parallel architectures." In Proceedings of the 2013 IEEE/ACM International Symposium on Code Generation and Optimization (CGO), pp. 1-11. IEEE Computer Society. 2013. US.

Yi Yang et al.; "A Case for a Flexible Scalar Unit in SIMT Architecture." In Parallel arid Distributed Processing Symposium, 2014 IEEE 28th International, pp. 93-102. IEEE, 2014. US.

Syed Zohaib Gilani et al. "Power-efficient computing for compute-intensive GPGPU applications." In High Performance Computer Architecture (HPCA2013). 2013 IEEE 19th International Symposium on, pp. 330-341, IEEE, 2013. US.

\* cited by examiner

GRAPHIC PROCESSOR UNIT PROVIDING REDUCED STORAGE COSTS FOR SIMILAR OPERANDS

STATEMENT REGARDING FEDERALLY SPONSORED RESEARCH OR DEVELOPMENT

This invention was made with government support under 1217102 and 0953603 awarded by the National Science Foundation. The government has certain rights in the invention.

CROSS REFERENCE TO RELATED APPLICATION

Background of the Invention

The present invention relates to computer architectures and in particular to GPU-type architectures providing single instruction multiple thread (SIMT) execution.

A graphics processing unit (GPU) is an electronic computer architecture originally intended for graphics processing but also used for general purpose computing. In a GPU, a single instruction can execute simultaneously in multiple threads accessing different data (for example, image data). Typically a GPU provides a large number of execution units sharing fetch/decode/scheduling (FDS) logic.

During operation of the GPU, operand data for each of the execution units is stored in a "register file" as an "operand vector" that will be transferred to the execution units for processing (vector processing) and then written back to the register file. The improvement of GPU computing capability, like many computer architectures, is increasingly limited by power and thermal constraints. Power is principally consumed by these two elements of the execution units and the register file, the latter of which uses multiple static random access memory (SRAM) arrays.

SUMMARY OF THE INVENTION

The present invention provides a GPU architecture that monitors similarities between the operand vectors of different execution units to provide a simultaneous and synergistic savings of power when those operand vectors are identical. This power savings is obtained by (1) fetching only a single operand vector, allowing most of the register file memory to remain in a low-power mode, and (2) executing that single operand on only a single execution unit allowing the other execution units to remain in low-power mode. In the latter case the result from the single execution unit is used for the other execution units in a so-called scalar execution. The implementation of the scalar execution may use the existing execution units and perform routing using a standard crossbar switch.

The invention further evaluates the similarity of operand vectors informed by which threads are active during branch divergence so that the technique of (2) may be used even when all operand vectors are not identical.

Portions of the invention may make use of the existing crossbar switch in most GPU architectures for compression of operand vectors to reduce memory power consumption even when the operands are not identical. This is done by selectively routing or sorting different portions of partially matched operands into a single memory circuit.

More specifically, in one embodiment, the present invention provides a computer architecture having a register file holding vector registers of operands in different memory circuits and a set of execution units for single instruction multiple thread SIMT execution of an instruction in parallel using a set of operands. Scalar execution circuitry evaluates operands of a set of operands subject to a read request by the execution units, and when all operands of the set of operands are identical: (i) transfers only a representative operand of the set of operands to a single execution unit without activating memory circuits for each of the operands of the set of operands; (ii) executes an operation on representative operand in the single execution unit while holding other execution units idle; and (iii) stores a result of execution of the representative operand as a single operand without activating memory circuits for each of the operands of the set of operands.

It is thus a feature of at least one embodiment of the invention to provide a energy-efficient scalar execution that synergistically combines the energy savings of executing on a single execution unit with reduced power costs in accessing the necessary data from the register file.

The representative operand may be held in a register separate from the memory circuits of the register file.

It is thus a feature of at least one embodiment of the invention to eliminate the need to activate the register file entirely in favor of a special, possibly high speed and low power register holding the needed operand vector.

The computer architecture may further include a crossbar switch providing a parallel connection on a path between each vector register and an execution unit according to a crossbar switch command permitting connection of a given vector register to any execution unit, and the scalar execution circuit may transfer the representative operand to a single execution unit using the crossbar switch and store the result of execution in one vector register using the crossbar switch.

It is thus a feature of at least one embodiment of the invention to provide scalar execution using the existing execution units selected with the crossbar switch.

The execution units may provide trigonometric functions.

It is thus a feature of at least one embodiment of the invention to permit the use of standard execution units with advanced arithmetic capabilities, as opposed to a special scalar processor, for scalar execution.

When all operands of the set of operands subject to a read request by the execution units are not identical (for example, during non-scalar execution), the scalar execution circuitry may: (iv) transfer different operands of the set of operands to different execution units; (v) execute the different operands on the different execution units; and (vi) in the case of branch divergence between the different execution units, identify results of executions associated with one branch ha active branch divergence operands. When the scalar execution circuitry evaluates operands of a set of operands subject to a read request by the execution units, and when all operands of the set of operands subject to the read request are not identical but all branch divergence operands of the set of operands are identical, the scalar execution circuitry may further (vii) transfer only a divergence representative operand of the branch divergence operands to a single execution unit without activating all of the memory circuits or each of the branch divergence operands; and (viii) execute the divergence representative operand on the single execution unit while holding other execution units idle; and (ix) storing a result of execution of the divergence representative operand.

It is thus a feature of at least one embodiment of the invention to allow effective scalar execution on a subset of threads during branch divergence allowing energy savings to be obtained during branch divergence operations, such as have been determined by the inventors to be frequent.

The result of the execution of the divergence representative operand maybe stored in multiple vector registers in different memory circuits.

It is thus a feature of at least one embodiment of the invention to eliminate the compression during the storage stage during branch divergence to greatly simplify encoding circuitry.

Alternatively or in addition the scalar execution circuitry may: (iv) evaluate operands being written to the register file across a set of operands to identify identical and non-identical portions of those operands of the set of operands and route any non-identical portions preferentially into one memory circuit using a crossbar switch; (v) in response to a request for reading a set of operands by the execution units from the register file, where those operands include routed non-identical portions, activate a memory circuit holding the routed non-identical portions and not all of the memory circuits holding the set of operands; and (vi) provide the previously routed non-identical portions to multiple execution units.

It is thus a feature of at least one embodiment of the invention to provide greater power efficiency in the register file through a sorting process making use of the existing crossbar circuitry of the GPU.

The scalar execution circuitry may include combiner circuitry combining the sorted non-identical portions with corresponding identical portions to reconstruct the set of operands for multiple execution units.

It is thus a feature of at least one embodiment of the invention to reconstruct compressed operand data to allow normal operation without modification of the execution units.

These particular objects and advantages may apply to only some embodiments falling within the claims and thus do not define the scope of the invention.

DETAILED DESCRIPTION OF THE PREFERRED EMBODIMENT

Figure 1:
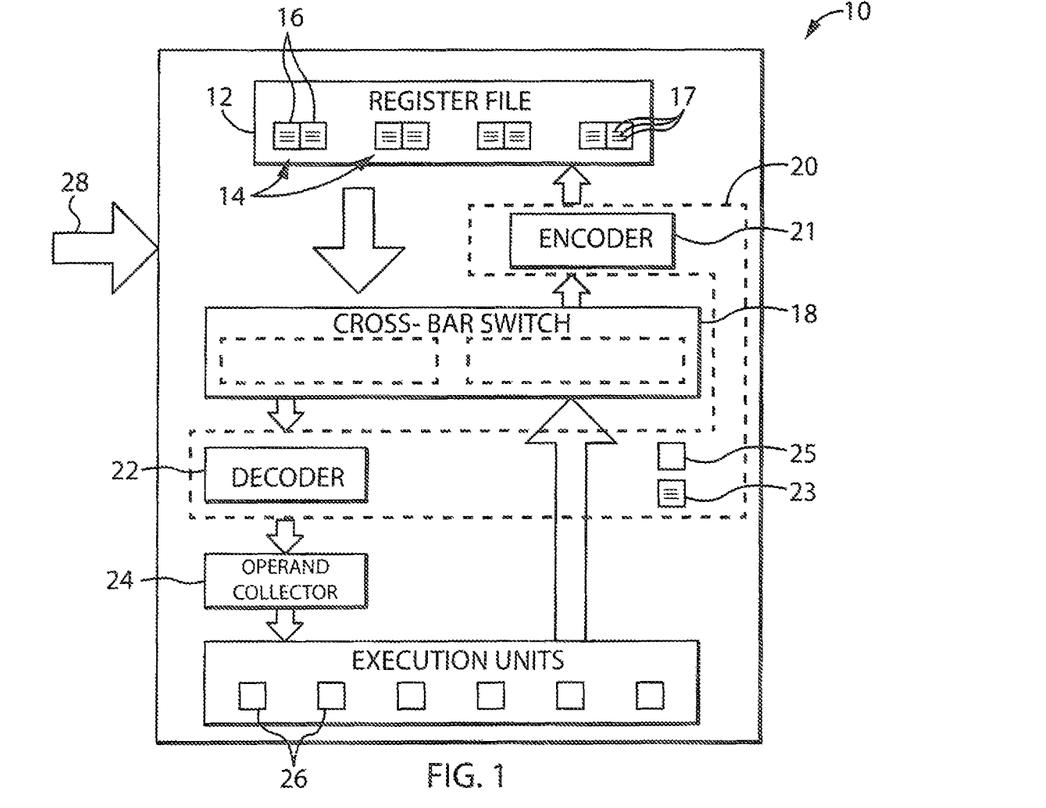
FIG. 1 is a simplified block diagram of a graphic processing unit showing the register file holding operand vectors which may be communicated to and from a set of execution units by means of a crossbar switch and furthering showing a scalar execution circuit of the present invention including an encoder and decoder.

Referring now to FIG. 1, a GPU system 10 of the present invention may provide a register file 12 having multiple logical banks 14 each using multiple memory circuits 16 such as SRAM. The memory circuit 16 may be individually controlled during data access for reading and writing to move between a low and high power mode state, the low-power mode state usable when data is not being accessed. Each bank may hold one or more multiple operand vectors 17.

The register file 12 may communicate its operand vectors 17 through a crossbar switch 18 and through a decoder 22 of scalar execution circuit 20 with the operand collector 24. The operand collector 24, in turn, provides the operand vectors 17 to individual execution units 26. Conversely, the execution units 26 may communicate operand vectors through the crossbar switch 18 and through encoder 21 of the scalar execution circuit 20 with the register file 12. The scalar execution circuit 20 provides an encoder 21 and decoder 22 as well as warp parameter register 23 and control logic circuitry 25 as will be discussed below.

Each execution unit 26 may receive a corresponding operand vector 17 for parallel operation with other execution units 26 as part of a single instruction, multiple thread architecture (SIMT). As is understood in the art, SIMT execution generally provides that the execution units 26 sequentially execute on the respective operand vectors in lockstep and in parallel in the absence of a branch divergence. A branch divergence, caused by differences in the results of branching instructions executed in different execution units (when the executing instruction receives different operands for the different execution units), temporarily interrupts this global lockstep execution in favor of lockstep execution of only a subset of the execution units branching in the same way (active threads).

The GPU system 10 may communicate through a bus system 28 with other computer elements, for example, those elements including a CPU, external memory, graphic displays, network ports, keyboards and the like which may be used to load the register file 12 with starting data and to read values from the register file 12.

Generally, during operation of the GPU system 10, data is sent to each execution unit 26 simultaneously from a set of operand vectors 17 of the register file 12 (the set of operand vectors termed a warp) to given execution units 26 which operate on the data of the operand vectors 17 to produce a writeback vector that is then written back to the register file 12 to become results or new operand vectors 17 for later execution.

Figure 2:
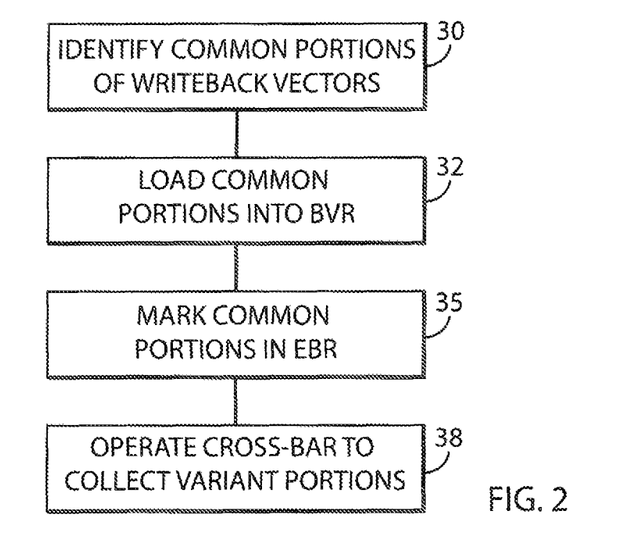
FIG. 2 is a flowchart showing encoding steps adopted by the present invention during a writeback of data from the execution units to the register files.
Figure 3:
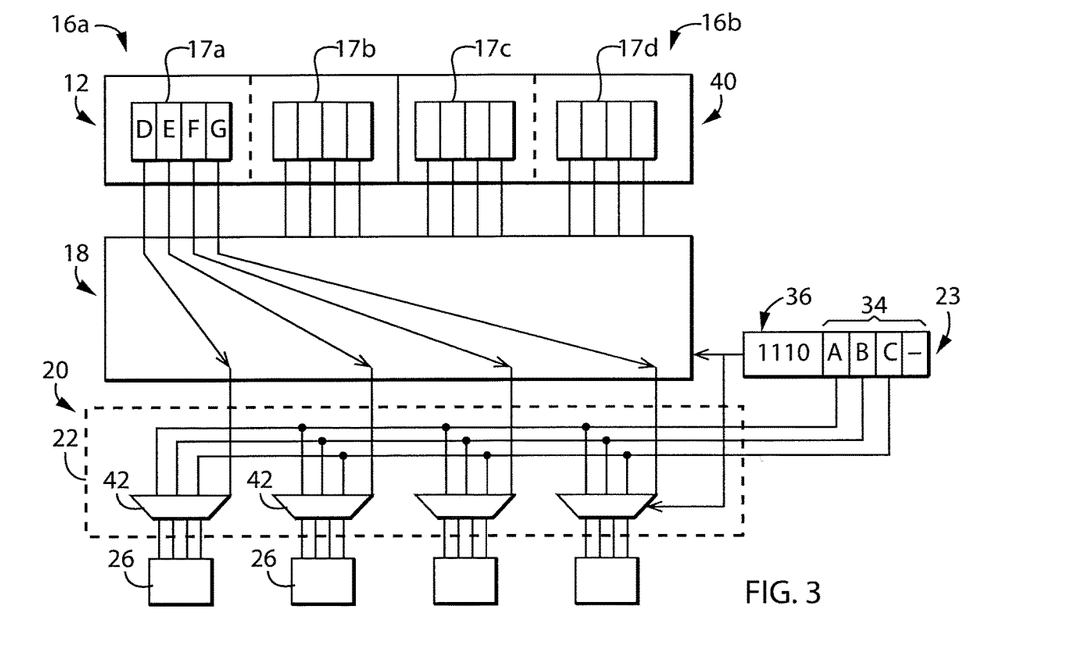
FIG. 3 is a representation of the graphics processor during a writeback of data from the execution units showing an encoding or routing of outputs from the execution units to the register file.
Figure 4:
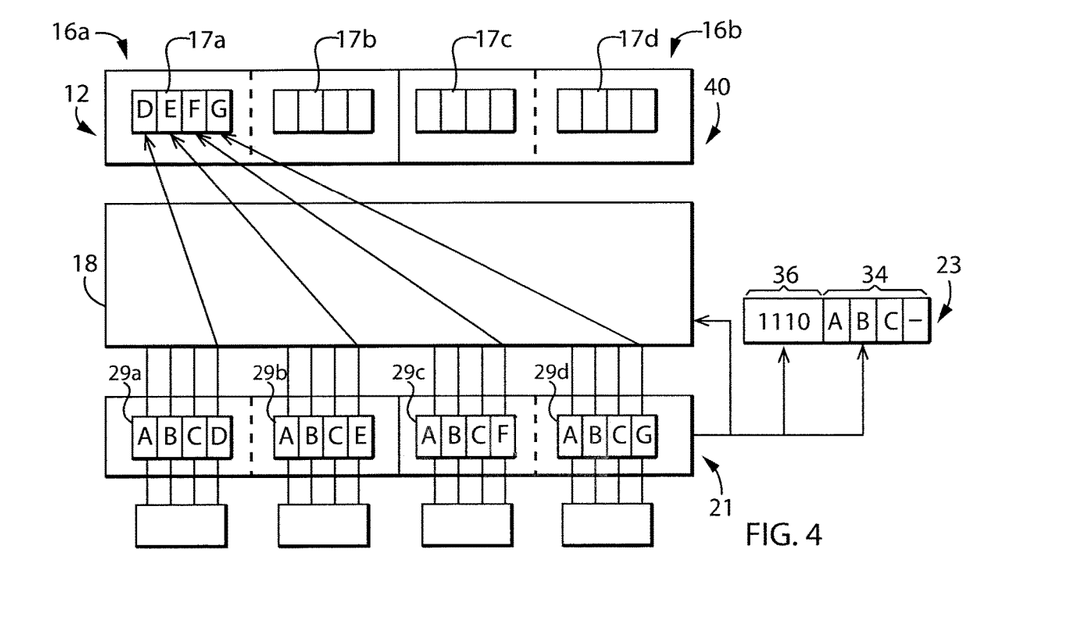
FIG. 4 is a figure similar to FIG. 3 showing a simplified register file after routing of the operand vectors of FIG. 3 during a reading of the register file and showing the decoding of the register files.

Referring now to also FIGS. 2 and 3 and 4, writeback vector 29a-29d may be received from the execution units 26 at encoder 21 of the scalar execution circuit 20 as a result of the execution of previous values of operand vectors 17 by the execution units 26. As indicated by process block 30 the encoder will evaluate these writeback vectors 29a-29b to identify common portions among different of the writeback vectors 29.

In this example, the operand vectors 17 and writeback vector 29 will be considered to be made up of four bytes of data. The writeback vectors 29 from the different execution units 26 have some identical portions, notably the first three bytes of [A, B, C], and some different portions, in this case the last byte (typically the least significant byte) which varies among each of the writeback vectors 29. This last byte will be labeled [D] for writeback vector 29a, [E] for writeback vector 29b, [F] for writeback vector 29c and [G] for writeback vector 29d.

As indicated by process block 35, the identical portions of the writeback vector 29 [A, B, C] are saved in a portion of a warp parameter register 23 designated the base value register (BVR) 34 as indicated by process block 32. The warp parameter register 23 may provide for a different entry for each warp with the entry indexed to that warp A second portion of the warp parameter register 23, designated the encoding bit register (EBR) 36, then receives a first mask [1, 1, 1, 0] indicating which portions of the writeback vectors 29 are common to each other (using a value of 1) and which portions of the writeback vectors 29 differ from each other (using a value of 0).

This value of the EBR 36 is provided to the crossbar switch 18 which routes portions of each writeback vector 29 according to the detected commonality of the data. In this case, the least significant bits of the writeback vectors 29 (the only differing portions) will be written to a single operand vector 17a stored in a single memory circuit 16a of the register file 12 as [D, E, F, G]. The order of the non-identical portions of the writeback vector 29 in the operand vectors 17a will be according to the order of the execution units 26 producing that data so as to allow the encoded values in operand vector 17a to be later decoded as discussed below. The common portions of the writeback vector 29 having been saved in the BVR 34 need not be stored. Note that this writeback requires activation only of a single memory circuit 16a, and memory circuit 16b may remain in a low power state.

The operation of the encoder 21 in this regard simply evaluates similarities among the writeback vectors 29, for example, by doing a byte-wise assessment of each byte of each writeback vector 29, and if they are equal placing a 1 in the corresponding portion of the EBR 36 and writing the value of common bytes among the writeback vectors 29 to the BVR 34. When the number of bytes that are different among the writeback vector 29 exceeds that which can be held by a single operand vector 17, additional operand vectors 17 may be used preferably in the same memory circuits 16.

Referring now to FIG. 4, when the data stored in a warp 40 is requested by the execution units 26, the warp parameter register 23 for that warp is interrogated to see whether the operand vectors 17 of the warp 40 include redundant data. In particular, EBR 36 is reviewed to control the crossbar switch 18 to route the non-common portions of the warp 40 to a set of multiplexers 42 contained in the decoder 22 and associated with each execution unit 26. The multiplexer 42 for each execution unit 26 will receive a different byte of operand vectors 17a corresponding to the portion of the warp 40 associated with the given execution unit 26. The remaining bytes are obtained from the BVR 34 and are assembled together to reconstruct the values of the writeback vector 29 previously stored in the register file 12. In this case, the operand vector 17a provides the least significant bytes [D, E, F, G] which are assembled by the multiplexers 42 to the common bytes [A, B, C] taken from the BVR 34. The process of reading operand vector 17a need only activate a single memory circuit 16a, thus saving power in the register file 12.

Figure 5:
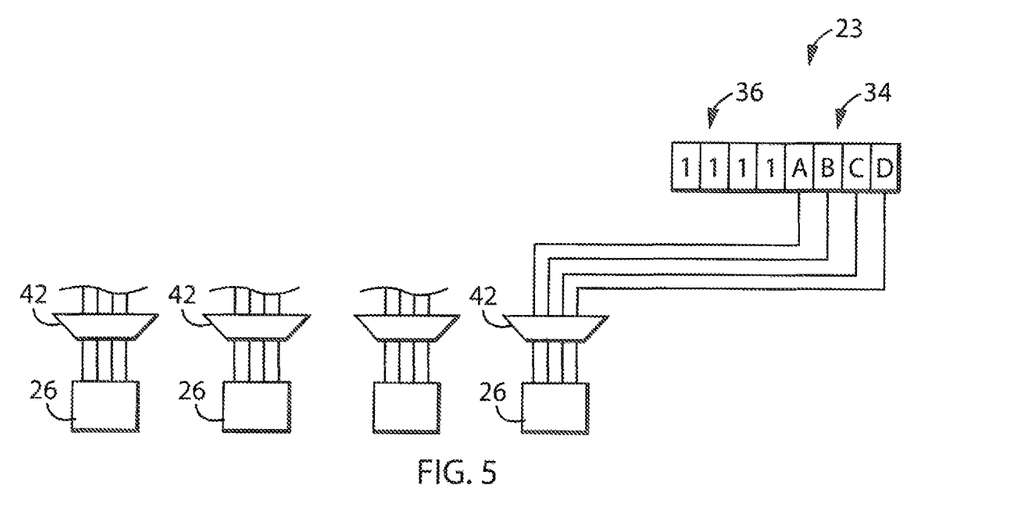
FIG. 5 is a fragmentary view similar to FIG. 4 showing the decoding process when all operand vectors are the same such as allows scalar execution.
Figure 6:
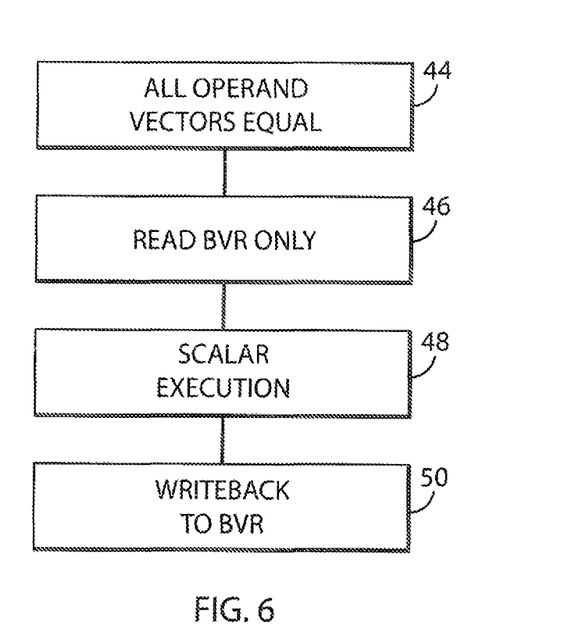
FIG. 6 is a flowchart of the steps of scalar execution of FIG. 5.

Referring now to FIGS. 5 and 6, the encoding system of the present invention has particular power savings benefit when the warp parameter register 23 and, in particular, the EBR 36 indicate that the operand vectors 17 needed by each execution unit 26 are identical. In this case, there is no need to access the register file 12 at all or to activate any of the memory circuits 16. Instead, when the EBR 36 indicates that all of the operand vectors for the warp 40 are identical [1, 1, 1, 1] as indicated by process block 44 of FIG. 6, the necessary data for each execution unit 26 is taken directly from the BVR 34 (holding [A, B, C, D]) as indicated by process block 46. Here, however, the logic circuitry 25 does not distribute the value of the BVR 34 to each of the multiplexers 42 but instead provides the data of the BVR 34 to a single multiplexer 42 and a single execution unit 26 for scalar execution. This single execution unit 26 executes the operand of the BVR 34 alone, with the remaining execution units 26 deactivated for power conservation per process block 48. In this way there is substantial savings both in the execution units 26 and in the register file 12.

Referring again to FIG. 3, at the time of writeback of the results from that single execution unit 26, the logic circuitry 25 overrides the comparison process of the encoder 21 to write the EBR 36 with a value indicating all of the writeback vectors are equal [1, 1, 1, 1] resulting in the writeback vector 29 being stored exclusively to the BVR 34, again without activation of the memory circuits 16 for substantial power savings. This writeback is indicated by process block 50.

Figure 7:
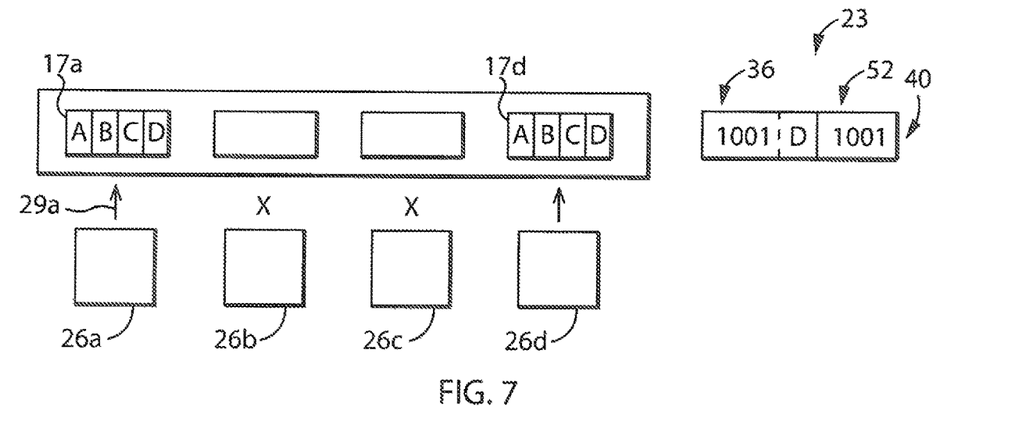
FIG. 7 is a fragmentary view similar to FIG. 3 showing the encoding process when there has been branch divergence.
Figure 8:
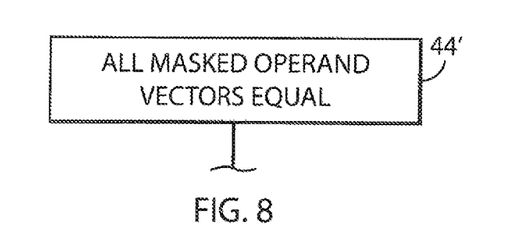
FIG. 8 is a fragmentary view of the flowchart of FIG. 6 showing an expansion of a modification of that flowchart for branch divergence.

Referring now to FIGS. 7 and 8, during the execution of different operand vectors 17a-17d by the execution units 26, a branch divergence may occur in which the control flow of the threads among different execution units 26 diverges, for example, because of different branch paths being taken in the execution of a single instruction on different execution units 26, in light of the different operand vectors 17 received by the different execution units. In the depicted example, only two of the execution units, execution unit 26a and execution unit 26d, may execute to produce writeback vector 29a and 29d, and execution units 26b and 26d may be stalled. The normal comparison process of the encoder 21, in this case, is not meaningful because of the failure to have comparison values for writeback vectors 29b and 29c. In this case, the logic circuitry 25 suppresses the encoding of the writeback vectors 29a and 29d (that is logic circuitry 25 causes writing each of these writeback vectors 29a and 29d to the register file 12 without modification to separate operand vector 17a and 17d. These active threads (of execution units 26a and 26d) producing writeback vectors 29a and 29d are identified in a mask 52 which may be stored in place of the BVR 34. For example, the bits of the mask 52 may be 1 when the corresponding thread is active and 0 when the corresponding thread is inactive. The data normally stored in the BVR 34 is not required because there is no encoding or compressing of the writeback vector 29. Therefore this storage space may be used for the mask 52. In addition the EBR 36 is marked to indicate that a branch diversion occurred, for example, indicated by the letter D in the EBR value 36. This indication will be used when the data is again recalled by the execution units 26.

While there is no compression of the writeback vector 29 in this example of branch divergence, it will be appreciated that when the warp 40 associated with warp parameter register 23 for this data that was just generated is next provided to the execution units 26, the operand vectors 17a and 17*b* for the active threads will be identical and hence could be executed in scalar fashion by one execution unit 26. This state is determined by using the mask 52 to filter the EBR value 36 to check for equivalence only in the active threads. That is, whether the threads are identical as indicated in the EBR 36 is considered only for those threads marked with a 1 in the mask 52.

Thus, as shown in FIG. 8, the previously described process block 44 of FIG. 2 may be expanded as process block 44' to consider only active threads rather than whether all threads have equal operand vectors. In this way, scalar execution can be exploited in common situations of branch divergence, greatly increasing the efficiency that can be gained from this technique.

This technique which selectively encodes or does not encode data depending on whether the threads are divergent or not can create a situation where branch diversion instructions must update a value of an encoded operand vector 17. This can be detected by examining the active mask 52, and when such a case occurs, the GPU system 10 may implement a special register-to-register move instruction to retrieve and decode the encoded operand vector 17 and store it back into the register file 12 without encoding it.

Figure 9:
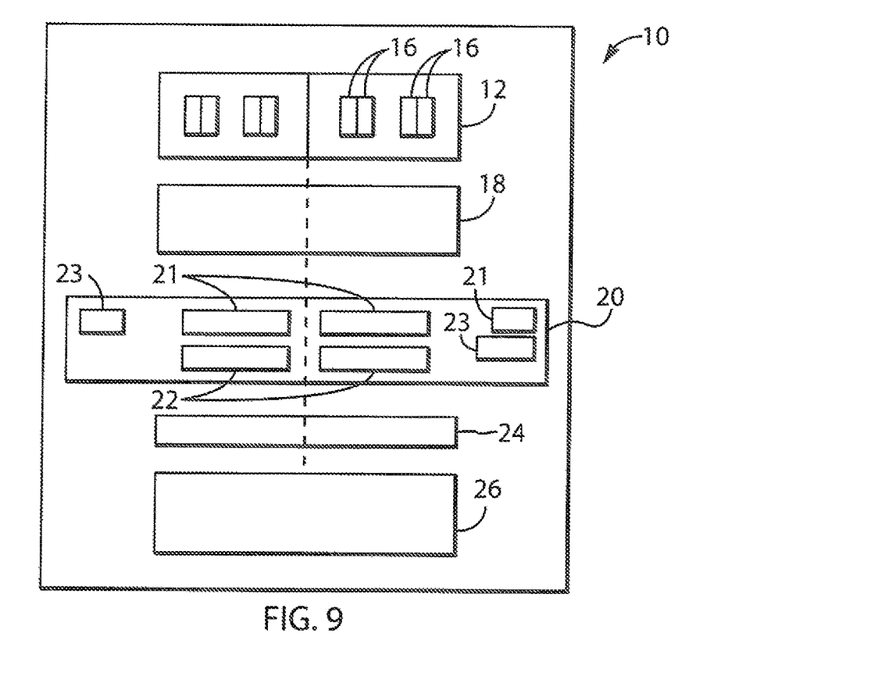
FIG. 9 is a figure similar to that of FIG. 1 showing duplication of the scalar execution circuitry of the present invention to operate on different portions of the register file to increase the opportunities for scalar execution.

Referring now to FIG. 9, the opportunities for scalar execution can be increased by dividing scalar execution circuit 20 into two (or more) portions each containing duplicate encoders 21, decoders 22, and warp parameter register 23, that may in turn deal independently with respective portions of the register file 12, that is, each dealing with a subset of the warp of operand vector 17. By subdividing the operand vectors 17 into smaller groupings, the potential that all operand vectors 17 are the same is increased, thus increasing the opportunity for scalar execution.

Certain terminology is used herein for purposes of reference only, and thus is not intended to be limiting. For example, terms such as "upper", "lower", "above", and "below" refer to directions in the drawings to which reference is made. Terms such as "front", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may be additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microprocessor" and "the processor," can be understood to include one or more microprocessors that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A computer architecture comprising:
a register file holding vector registers of operands in different memory circuits;
a set of execution units for SIMT execution of an instruction in parallel using a set of operands; and
scalar execution circuitry evaluating operands of a set of operands subject to a read request by the execution units, and when all operands of the set of operands are identical;
(i) transferring only a representative operand of the set of operands to a single execution unit without activating memory circuits for each of the operands of the set of operands;
(ii) executing an operation on the representative operand on the single execution unit while holding other execution units idle; and
(iii) storing a result of the execution of the representative operand as a single operand without activating memory circuits for each of the operands of the set of operands;
wherein the scalar execution circuitry further:
(iv) evaluates operands being written to the register file across a set of operands to identify identical and non-identical portions of those operands of the set of operands and sorts any non-identical portions preferentially into one memory circuit using a crossbar switch and separately sorts a representative identical portion into a storage location different from the one memory circuit;
(v) in response to a request for reading a set of operands by the execution units from the register file where those operands include sorted non-identical portions, activates a memory circuit holding the sorted non-identical portions and not all of the memory circuits holding the set of operands and combining each sorted non-identical portion with the representative portion to provide reconstructed operands; and
(vi) provides the reconstructed operands to multiple of the execution units.

2. The computer architecture of claim 1 wherein the representative operand is held in a register separate from the memory circuits of the register file.

3. The computer architecture of claim 1 further including a crossbar switch providing a parallel connection on a path between the register file and the execution units according to a crossbar switch command permitting connection of a given vector register to any execution unit and wherein the scalar execution circuit transfers the representative operand to a single execution unit using the crossbar switch and stores the result of execution in one vector register using the crossbar switch.

4. The computer architecture of claim 3 wherein the execution units provide trigonometric functions.

5. The computer architecture of claim 1 wherein the scalar execution circuitry, when all operands of the set of operands subject to a read request by the execution units are not identical;
(iv) transfers different operands of the set of operands to different execution units;
(v) executes the different operands on the different execution units;
(vi) in a case of branch divergence between the different execution units, identifies results of executions associated with one branch as active branch divergence operands;
wherein when the scalar execution circuitry evaluates operands of a set of operands subject to a read request by the execution units, and when all operands of the set of operands subject to the read request are not identical but all branch divergence operands of the set of operands are identical:
(vii) transfers only a divergence representative operand of the branch divergence operands of the set of operands to a single execution unit without activating memory circuits for each of the operands of the set of operands or each of the branch divergence operands of the set of operands;
(viii) executes the divergence representative operand on the single execution unit while holding other execution units idle; and
(ix) stores a result of execution of the divergence representative operand.

6. The computer architecture of claim 5 wherein the result of the execution of the divergence representative operand is stored in multiple vector registers in different memory circuits.

7. The computer architecture of claim 1 wherein the scalar execution circuitry includes combiner circuitry combining the sorted non-identical portions with the representative identical portion to produce the set of reconstructed operands for multiple execution units and wherein the storage location provides a mask mapping bits of the sorted non-identical portions and representative identical portion to each reconstructed operand.

8. The computer architecture of claim 7 wherein the scalar execution circuitry further includes an encoding register separate from the register file holding a copy of the identical portions of the operands for combining with the sorted non-identical portions.

9. A computer architecture comprising:
a register file holding vector registers of multiple operands in different memory circuits;
a set of execution units for SIMT execution of an instruction in parallel using a set of operands;
a crossbar switch providing a parallel connection of banks of the register file to execution units according to a crossbar switch command permitting connection of a vector register to any execution unit; and
scalar execution circuitry:
(i) evaluating operands being written to the register file across a set of operands to identify identical and non-identical portions of those operands of the set of operands and controlling the crossbar switch to route any non-identical portions preferentially into one memory circuit and sort a representative identical portion into a storage location different from the one memory circuit; and
(ii) in response to a request for reading a set of operands by the execution units from the register file where those operands include routed non-identical portions, activate a memory circuit holding the routed non-identical portions and combining each routed non-identical portion with the representative portion to provide reconstructed operands to multiple of the execution units.

10. The computer architecture of claim 9 wherein the scalar execution circuitry further controls the crossbar switch to reroute the any non-identical portions from one bank to multiple execution units.

11. The computer architecture of claim 10 wherein the scalar execution circuitry includes combiner circuitry combining the rerouted non-identical portions with the representative identical portions to reconstruct the set of operands for multiple execution units and wherein the storage location provides a mask mapping bits of the sorted non-identical portions and representative identical portion to each reconstructed operand.

12. The computer architecture of claim 9 wherein the scalar execution circuitry further includes an encoding register separate from the register file for holding the representative identical portion of the operands combined with the rerouted non-identical portions.

13. The computer architecture of claim 9 wherein the scalar execution circuit includes an encoding register recording for each operand which portions are identical and which portions are non-identical and wherein the encoding register is written to when the operands are written to the register file and the written value in the encoding register is used when the operands are read from the register file for control of the crossbar switch.

14. The computer architecture of claim 9 wherein the scalar execution circuitry further controls the execution units to execute only a single operand on a single execution unit when an evaluation of operands across the set of operands indicates that there are no non-identical portions.

15. The computer architecture of claim 9 wherein the scalar execution circuit detects branch divergence in the execution of the execution units to block controlling crossbar switch to route any non-identical portions preferentially into one bank.

16. The computer architecture of claim 9 wherein the scalar execution circuitry detects a subset of active execution units after a branch divergence to control subsequent operation of the execution units to execute only a single operand on a single execution unit when an evaluation of operands across the set of operands indicates that there are no non-identical portions in the portion associated with execution units that were active.

17. The computer architecture of claim 9 wherein the execution units provide trigonometric functions.

18. The computer architecture of claim 9 wherein the scalar execution circuit detects branch divergence in the execution of the execution units to control the crossbar switch to not route non-identical portions while there is divergence.

19. A method of executing programs on a computer architecture having:
a register file holding vector registers of operands in different memory circuits;
a set of execution units for SIMT execution of an instruction in parallel using a set of operands;

scalar execution circuitry evaluating operands of a set of operands subject to a read request by the execution units, and when all operands of the set of operands are identical:

(i) transferring only a representative operand of the set of operands to a single execution unit without activating memory circuits for each of the operands of the set of operands;

(ii) executing the representative operand on the single execution unit while holding other execution units idle; and (iii) storing a result of execution of the representative operand as a single operand without activating memory circuits for each of the operands of the set of operands;

the method comprising, when operands subject to a read request by execution units are identical, the steps of:

(a) transferring only a representative operand of the set of operands to a single execution unit without activating memory circuits for each of the operands of the set of operands;

(b) executing the representative operand on the single execution unit while holding other execution units idle; and (c) storing a result of execution of the representative operand as a single operand without activating memory circuits for each of the operands of the set of operands; and further including the steps of:

(d) evaluating operands being written to the register file across a set of operands to identify, identical and non-identical portions of those operands of the set of operands and sorts any non-identical portions preferentially into one memory circuit using a crossbar switch and sorts a representative identical portion into a storage location different from the one memory circuit;

(e) in response to a request for reading a set of operands by the execution units from the register file where those operands include sorted non-identical portions, activating a memory circuit holding the sorted non-identical portions and not all of the memory circuits holding the set of operands and combining each sorted non-identical portion with the representative portion to provide reconstructed operands; and (f) providing the reconstructed operands to multiple of the execution units.

* * * * *